Sept. 22, 1959  J. B. O'MALEY ET AL  2,905,828
LIGHT TRACKING DEVICE

Filed Nov. 20, 1952  6 Sheets-Sheet 2

INVENTORS
JAMES B. O'MALEY
JOHN W. BARNES
PAUL D. HANSELL
BY
ATTORNEYS

Sept. 22, 1959 J. B. O'MALEY ET AL 2,905,828
LIGHT TRACKING DEVICE

Filed Nov. 20, 1952 6 Sheets-Sheet 3

INVENTORS
JAMES B. O'MALEY
JOHN W. BARNES
PAUL D. HANSELL
BY
Ostrolenk, Faber,
Gerb & Soffen
ATTORNEYS

FIG. 9

INVENTORS
JAMES B. O'MALEY
JOHN W. BARNES
PAUL D. HANSELL
BY
ATTORNEYS

FIG. 11.

A: STAR AT CENTER
B: STAR OFF CENTER
C: BACKGROUND ILLUMINATION-UNIFORM
C₁: BACKGROUND ILLUMINATION-NONE
D: BACKGROUND ILLUMINATION-GRADIENT
E: ASYMMETRIES IN THE SYSTEM PERMITTED TO AFFECT THE RESULT

| | | |
|---|---|---|
| A | | 48 Kc |
| B | 4 Kc | 48-.4  48  48+.4 |
| C | 0 cps | |
| C₁ | 0 cps | |
| D | 4 Kc | |
| A-C OR A-C₁ (SAME AS A) | | 48 Kc |
| A-D (SAME AS B EXCEPT FOR SIDEBANDS) | 4 Kc | 48 Kc |
| B-C (SAME AS B) | 4 Kc | 48-.4  48  48+.4 |
| B-C₁ (SAME AS B) | 4 Kc | 48-.4  48  48+.4 |
| B-D | b.iL.g.—/—STAR  .4 Kc | 48-.4  48  48+.4 |
| A+E (SAME AS A-D) | 4 Kc | 48 Kc |
| A+C+E | ASYM. DIFFERENT PHASE FROM 4 Kc STAR b.iL.g. | 48-.4  48  48+.4 |
| A-D-E | b.iL.g.—/—ASYM.  4 Kc | 48-.4  48  48+.4 |
| B-E | STAR—/—ASYM.  4 Kc | 48-.4  48  48+.4 |
| B-C-E | STAR—/—ASYM.+BACKGROUND  4 Kc —ASYM. | 48-.4  48  48+.4 |
| B-D-E | b.iL.g.—/—STAR, —ASYM.+BACKGR., —ASYM.  4 Kc | 48-.4  48  48+.4 |

INVENTORS
JAMES B. O'MALEY
JOHN W. BARNES
PAUL D. HANSELL
BY
ATTORNEYS

United States Patent Office 2,905,828
Patented Sept. 22, 1959

2,905,828

LIGHT TRACKING DEVICE

James B. O'Maley, Mineola, John W. Barnes, Floral Park, and Paul D. Hansell, Jackson Heights, N.Y., assignors to Kollsman Instrument Corporation, Elmhurst, N.Y., a corporation of New York Application November 20, 1952, Serial No. 321,696

11 Claims. (Cl. 250—203)

The present invention relates to a light tracking device and more particularly to a light tracking device adapted to respond accurately to the location of a light source (such as the image of a star, a local guide light or a reflector light) in the field of view without interference from background illumination or gradients or other variations in background illumination within the field of view.

This invention is, therefore, an improvement over the device shown in application Serial No. 95,768, filed May 27, 1949.

Essentially, a light tracking device utilized for navigational purposes is provided with an optical system adapted to transmit an image of a celestial object to means which will seek to operate the optical system to maintain the said image in the center of the field of view. The movements of the optical system may then be translated into corresponding movements of location indicia or into predetermined movements of operating or adjusting members for craft guidance instruments or devices.

Where the background in the field of view is dark, then the observed object may readily be used for reference and no special problems are created.

In actual use, however, the background in the field of view may frequently be illuminated and this background illumination may interfere with proper operation of the light tracking device or cause false tracking.

The background illumination may be of two types: a uniform background field or a field having a gradient of illumination varying in an unforeseeable way.

The uniform background illumination creates in the electrical system responsive to the light received (where photo-emissive types of detectors are used) a noise level varying with the relative intensity of the background light.

A difficult problem arises in the case where the background illumination has a gradient, that is, when it varies in intensity over the field of view.

In such cases the operation of devices of the type mentioned above may produce as a result of the gradient in background illumination a signal similar to or identical with the signal which may be received as a result of an off-center position of the star being tracked. The two signals mixed together produce a resultant signal which is applicable to neither but which correspond to the signal which would be produced by an off-center position of the star. The light tracking device is designed to respond electro-mechanically to such an off-center signal to move the optical elements to null the signal. The movement of the tracker to a null position of the signal as a consequence of the false off-center indication will now cause a displacement or aiming error. If the error angle is such that the image of the celestial object goes beyond the field of view then the tracking information becomes completely useless.

Previous star trackers were provided essentially with a rotating chopper for modulating the incoming light from the celestial object such as a star. The beam was then directed to the photo-sensitive surface of a photo-responsive device such as a photo-multiplier tube to provide an electric signal which is a function of the position of incoming light beam. This electric signal was then amplified to control orienting motors for moving the star tracker to center the star image in the optical system.

This prior system utilizing a single light modulating mechanism which essentially derived only positional or displacement information will be referred to as single modulation.

If a gradient of illumination exists across the plane of the semi-circular shutter or other devices which produces the single modulation, the modulated light may correspond to the light output produced by an off-center star. This is particularly true with a gradient where the light level varies along a diameter. In practice, within the small fields usually utilized, the gradient is approximately linear from a maximum at one end of a diameter to a minimum at the other end of the same diameter.

Asymmetries in the photo-sensitive and optical system may in the presence of background light even when uniform give rise to erroneous signals of the type produced by a gradient in background illumination. It is possible to compensate for such erroneous signals where the background illumination is assumed to be of constant intensity. Where, however, the background illumination may vary, as it does, in random manner, compensation of the optical and photo systems cannot solve the problem. Such asymmetries in the single modulation system will cause background illumination to give rise to a false signal corresponding to a false position of the star image with respect to its actual position in the optical system.

Our invention is directed to a double modulation system which removes background illumination as a factor and thereby avoids this source of error.

These disadvantages are overcome by our novel star tracker in which the light beam from the desired star is modulated at two widely different frequencies, a low frequency by means of a semi-circular shutter rotating about an axis concentric with the center of the field of the telescope of the star tracker and a high frequency modulation by means of a disc with radial angularly spaced equal area lines and gaps. The axis of rotation of the disc is located outside of the optical field, the width and spacing of such lines in the field of view being not less than the width of the star image.

The number of such radial lines and the speed of rotation of the raster cause a modulation of the light beam at a relatively high repetition rate or high frequency.

The background light in the field of view covers an area which includes a substantial number of lines and spaces on the raster and, therefore, will not be modulated by the raster. This background light will reach the semi-circular shutter as a continuous unmodulated beam. The light which passes through the raster is then chopped by the semi-circular shutter.

The light reaching the photo-sensitive medium may have the following characteristics:

| | Light source | Raster effect | Shutter effect | Light reaching photo cell |
|---|---|---|---|---|
| 1 | Uniform background. No star. | Nil | Nil | Steady. |
| 2 | Uniform background. Centered star. | High frequency star signal | Nil | High frequency modulated. |
| 3 | Uniform background. Off-center star. | ___do___ | Low frequency modulated high frequency star signal or low frequency signal. | Low frequency modulated high frequency star signal or low frequency signal. |
| 4 | Background gradient. No star. | Nil | Low frequency background signal. | Low frequency signal. |
| 5 | Background gradient. Centered star. | High frequency star signal | ___do___ | High frequency and low frequency. |
| 6 | Background gradient. Offcenter star. | ___do___ | Low frequency modulated high frequency star signal and low frequency due to chopping of star and background. | Low frequency modulated high frequency star signal and low frequency due to chopping of star and background. |

The light beam subject to these conditions will reach a photo-emissive tube which may have at its output tuned circuits or filters. Suitable amplifiers are connected to these tuned circuits to energize the orienting motors of the star tracker.

The light output from the star is transformed at a phototube into an electric signal similar to a modulated wave and is passed through the filter or tuned circuits to the successive amplifiers since the tuned circuits are tuned at the carrier frequency or the frequency corresponding to the high repetition rate of the light pulses produced by the raster. The output resulting from background light, on the other hand, is always a low frequency electric signal which is rejected by the tuned circuits.

From the above it is now evident that no false tracking or aiming errors will occur due to background light with this novel light tracker.

One object of the present invention is, therefore, the provision of means whereby a light tracker separates a star from the background sky illumination.

The use of a raster in addition to the shutter eliminates tracking or aiming errors due to gradients in background illumination.

Our novel star tracker can be made to automatically orient itself to the desired star after being approximately aimed by dead reckoning position. As soon as the star appears in the field of view, the tracker will center. In other words, with the present invention the star may be recentered automatically after temporary obscuration by clouds.

Prior star trackers did not provide a continuous indication of star presence when the star was located at the center of the optical system. Our novel device, as shown by lines 2 and 3 of the chart above, provides a definite indication of the presence of the star at the center of the field as well as elsewhere in the field.

In some uses of a tracking system, it is necessary (as for instance in unmanned navigation) to have a star tracker (1) automatically operable only with respect to a star of predetermined apparent brightness, (2) angular displacement sensitivity (of the servo mechanisms) be held reasonably constant regardless of variations in star illumination received, (3) revert automatically to dead reckoning controls when light conditions are unsuitable for tracking (no star or obscuration or too high a level of background illumination).

Accordingly, another object of the present invention is a star tracker that will orient itself to a desired star from a dead reckoning position.

A further object of the present invention is the provision of means whereby a star tracker will automatically respond to the apparent brightness of a star, to unsuitable tracking conditions, to daylight and to illuminated haze.

At the output of the shutter we find, therefore, an unmodulated high frequency signal corresponding to the light coming from the centered star and a low frequency signal corresponding to the gradient of background illumination.

These two signals superimposed are translated into electrical signals by the photo-multiplier.

The low frequency signal is rejected by a tuned circuit designed to pass only the high frequency signal, thus making the star tracker operable only in response to the high frequency signal. Also, for an off-center star in a background gradient (item 6 of chart above), the tuned circuit selects only the star modulated signal and rejects low frequency signals including those developed by the background. This low frequency is a function of the speed of rotation of the shutter (which may be i.e. 400 cycles per second).

The high frequency signal after passing through the tuned circuit may be considered to consist of three frequencies, one centered at the raster frequency (i.e. 48 kilocycles as determined by the number of lines and spaces in the raster and speed of rotation of the raster); still another at 48.4 kilocycles and finally another one at 47.6 kilocycles. The pass band of the tuned circuit is such as to include the raster frequency and its primary side bands.

Another object of the present invention is, therefore, the provision of means of eliminating the effects of gradients in background illumination on a star tracker and thereby avoid false tracking or tracking errors.

The light flux from the selected star received by the optical system varies with atmospheric attenuation. Because of the change in light flux from a star due to varying atmospheric conditions, our star tracker is provided with circuits which maintain the displacement sensitivity of the star tracker substantially constant. This is accomplished by reducing the gain of the high frequency amplifier following the photo-multiplier tube when the light flux increases and conversely increasing the gain of the amplifier when the light flux from the star decreases. This permits continuous operation of the star tracker with optimum performance under varying haze conditions short of obscuration.

In our novel star tracker, following the photo-multiplier tube a tuned high frequency amplifier is connected at its output to a detector circuit. The detector derives an A.C. signal from the modulated carrier corresponding to the envelope variations and a D.C. signal proportional to the average envelope amplitude.

The detected low frequency signal is then applied to a low frequency amplifier which in turn as described in the above-mentioned application energizes the windings of orienting motors.

This disadvantage of varying displacement sensitivity of single modulation systems is overcome by our novel star tracker: Our star tracker is provided with automatic gain control which applies a D.C. voltage to the high frequency amplifier to decrease the gain of the amplifier tubes when the average amplitude of the light carrier increases; and the automatic gain control increases the gain of the amplifier tubes when the average amplitude of the light carrier decreases. This maintains a constant displacement sensitivity.

Accordingly, a further object of the present invention is the provision of means whereby the star tracker has constant displacement sensitivity with respect to variations in light flux reaching the star tracker.

In prior star trackers no provision was made to discriminate between a selected star of one magnitude and other stars surrounding the desired star of different and often lower magnitudes.

Our novel star tracker is provided with a simple circuit which may be present to cause the unit to operate only when a star of a certain level of illumination appears in the field. The circuit for accomplishing this result consists essentially of a relay having its energizing coil in the plate circuit of one of the automatic gain controlled high frequency amplifier tubes immediately following the photo-multiplier tube.

The D.C. current flowing through the energizing coil is determined by the bias voltage applied between the grid and the cathode of this high frequency amplifier tube. When the grid bias is very negative, the D.C. plate current will decrease. When the grid bias becomes less negative, the D.C. plate current will increase.

The relay is provided with a pair of stationary contacts bridged by an armature. The stationary contacts are in the power circuit of the orienting motors so that when they are bridged by the armature of the relay, the orienting motors may operate. When they are opened, the orienting motors do not operate.

The relay of the star tracker may be set so that the star tracker will reject stars which are not within the range of brightness for which the unit has been set.

Since the more usual case is the selection of a brighter star from its neighbors, the armature of the relay is biased to the closed position so that when the D.C. plate current flowing in the amplifier tube concerned falls below a certain preselected value, the armature of the relay will under the action of the spring bias bridge the stationary contacts.

As previously mentioned, a drop in plate current may be produced by making the grid bias of the particular tube concerned more negative. It is thus seen that if the average envelope amplitude is sufficiently large, it will cause a drop in voltage at the grid of the high frequency amplifier tube, operating the relay to close the circuit of the orienting motors.

Another object of the present invention is, therefore, the provision of means for selecting for tracking certain stars on the basis of relative magnitude.

Our invention also contemplates that the same type of circuit may be used to reject stars above a predetermined maximum of brightness as well as to reject stars below a certain minimum of brightness.

Once the relay above mentioned is closed then, because of pull-in and drop-out current difference, our novel star tracker will remain operative until the illumination from the star becomes much lower than the threshold value at which operation will begin.

Accordingly, a further object of the present invention is the provision of means whereby the light tracker remains operative regardless of variations in the illumination from a light source. Within a selected range the star tracker will cease to operate only when such illumination drops much below a preselected threshold value. Thus, once a star is recognized as the correct star, the star tracker will continue tracking the star despite variations in apparent brightness even though the star light level drops below the threshold of acceptance.

In the particular case of a star tracker utilizing photoemissive cells, high levels of background illumination may increase the envelope amplitude by reason of the shot noise generated so as to reduce the gain of the high frequency amplifier tubes.

To overcome this problem our novel device provides a means of compensating for this effect. An amplifier is provided with two pass bands, one to pass the modulated envelope containing noise and the other remote from the carrier frequency of the first to obtain an envelope containing only random noise. These two envelopes are amplified simultaneously and then detected. The one detector produces a D.C. output which is a function of the combination of the modulated envelope with random noise, while the other will produce a D.C. voltage, a function of the shot noise amplitude only. The two D.C. voltages thus obtained are then applied to the area of a bridge to counteract within the limits of the range of the circuit the effect of D.C. voltage produced by the noise in the modulated envelope which would erroneously alter the gain of the high frequency amplifiers through the automatic gain control circuit and impair the operation of the tracker.

By this means it is, therefore, possible to extend the reliable range of operation of the star tracker with respect to background illumination.

Accordingly, another object of the present invention is the provision of means for compensating for the effect of shot noise in the A.G.C.

Should the background light become sufficiently intense as to completely swamp the signal from the star in noise and the tracking of the preselected star becomes faulty, our light tracker will automatically stop operating and will automatically operate again only when the background conditions are satisfactory for reliable tracking.

This is made possible in this invention by means of a circuit having an operating member responsive to a limiting value of noise voltage from the noise detector and thus, for a given star signal, in effect responsive to a limiting value of noise to signal ratio. For instance, the circuit may have a second relay whose armature also serves to bridge contacts in the motor circuits of the orienting motors. When the D.C. voltage from the detector due to shot noise becomes greater than a certain preselected maximum, the noise relay becomes operative and moves its armature to open the power circuit of the orienting motors, thus stopping the operation of our novel star tracker.

If the disturbance or better the noise to signal ratio falls back to its original value below the preselected maximum, the armature of the noise relay will again close the power circuit and the orienting motors, thus restoring the star tracker to operation.

It is necessary to underline the fact that the operation of the above-mentioned relay occurs only when the ratio of noise to signal and not the absolute value of noise reaches a certain preselected level because both the signal and the noise are amplified by the same circuitry, but the gain is essentially a function of the signal only.

It was previously mentioned that our novel star tracker uses a raster to first produce light pulses and a shutter to modulate such pulses. It is also possible to combine the raster and the shutter in one disc to have portions with opaque spaced radial lines and other portions completely opaque. The relative angular width of the opaque area corresponding to the shutter will be much greater than the angular width of general lines and spaces corresponding to the raster, thereby producing a desired difference in frequency between the raster chopping and the shutter modulation.

This arrangement will be most useful in sensing relative motion of the star radially of the disc in the field of view.

Its most useful application is in an instrument which is aligned by the same type of means or other means on a particular axis with the present device being used to detect motion at an angle to said axis.

The foregoing and many other objects of the invention will become apparent in the following description and drawings in which:

Figure 6C is a plot of the output of the detecting device of our novel star tracking device for the condition shown in Figure 6A.

Figure 1:
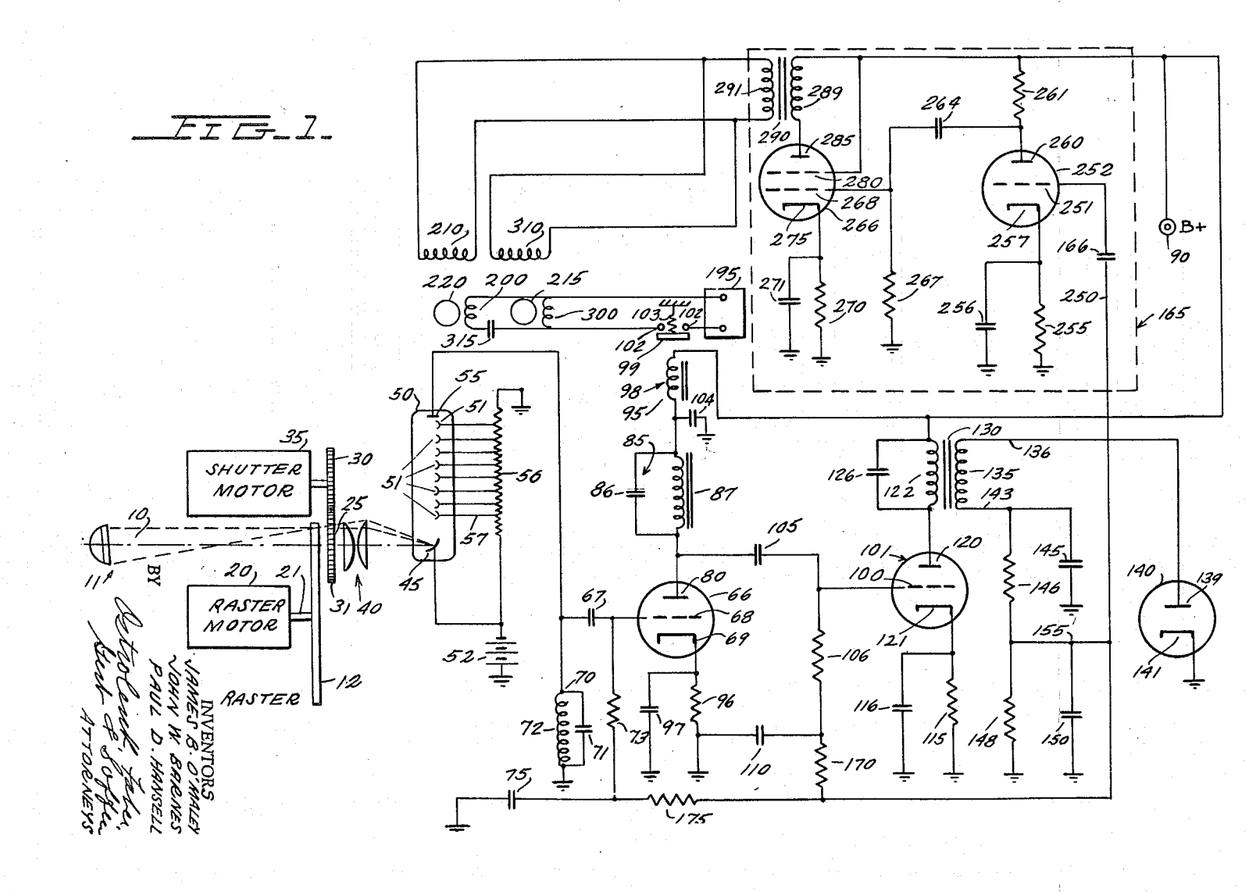
Fig. 1 is a schematic diagram of our novel star tracking device.

Referring first to Figure 1 showing a schematic diagram of the novel star tracking device, the star light is focused by means of objective 11 on the plane of raster 12. In other words, raster 12 is located approximately at the focal point of light beam 10.

Raster 12 hereinafter described is rotated at a predetermined speed by raster motor 20 through a shaft 21. Raster 12 (see Figure 2) is essentially a transparent disc 16 having a large number of radially placed opaque striations 15. Striations 15 in this particular construction extend from a circumference on disc 16 having a radius 17 to a second circle also on disc 16 having a radius 13. In other words, the length of striations 15 is equal to the radius 17 minus the radius 13 in this particular embodiment of raster 12.

Figure 2:
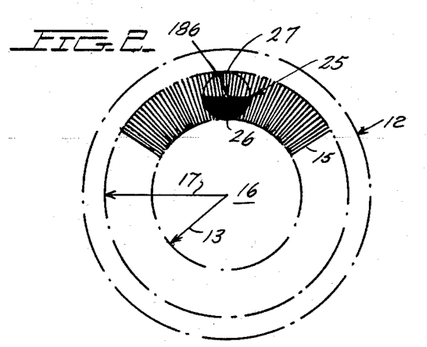
Figure 2 is a front view of the raster of our novel star tracking device showing the relative dimensions and positions of the raster and shutter mechanisms of our present invention.

Striations 15 of raster 12 will chop the beam of light 10 as raster 12 is rotated by motor 20 and because of the large number of striations 15 and relatively high speed of raster motor 20, the number of light pulses produced by raster 12 per second will be relatively high.

For example, in the present embodiment their frequency is 48 kilocycles.

Figure 3A:
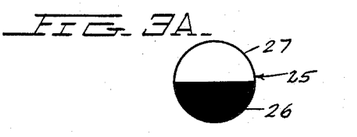
Figure 3A is a front view of the shutter mechanism of our present invention.

The now chopped beam 10 transverses shutter 25 which may be semi-circular as shown in Figure 3A. In other words, it may have half of its area 26 opaque, the other half 27 being transparent.

Shutter 25 may actually take other shapes, its only requirement being that shutter 25 have both an opaque area and a transparent area. The relative dimensions of shutter 25 and raster 12 may be seen more clearly in Figure 2 where shutter 25 is shown as being positioned behind raster 12. Shutter 25 is rotated at a uniform speed by means of a gear 30 in cooperation with a geared annular holder 31 rotatable around its center. Gear 30 is driven by shutter motor 35 which is preferably a two-pole synchronous orienting motor.

Shutter 25 has the function of chopping the light pulses produced by raster 12 at a relatively low rate. In other words, we may consider the light pulses coming from raster 12 as a carrier to be modulated at a low frequency, for example 400 cycles, by shutter 25. If an interrupting rate or modulation frequency of 400 cycles per second is desired and a two-pole synchronous motor is used, a line frequency of 400 cycles would also be required.

Actually, the pulses from raster 12 will be modulated by shutter 25 only if light beam 10 is off center with respect to shutter 25 as hereinafter described in connection with Figures 5A, 5B, 5C, 6A, 6B, 6C, 7A, 7B and 7C, and 4A, 4B and 4C.

Assuming that the beam of light is off center with respect to shutter 25, the high frequency light pulses from raster 12 as previously mentioned will now be modulated by shutter 25. The modulated light wave passes through a lens system 40 which produces on the cathode 45 of photo-amplifier tube 50 an image of the objective 11. The image of objective 11 on cathode 45 of photo-multiplier tube 50 will be, of course, much larger than the star producing beam 10.

The photo-multiplier tube 50 as is well-known in the art is provided in addition to cathode 45 with a plurality of secondary electron emitters 51 and with a plate 55. As the electrons travel from cathode 45 to plate 55 of photo-multiplier tube 50, they increase in number due to the effect of secondary electron emitters 51, each of which, as the electrons travel from cathode to plate, is at a potential higher than the previous one.

Such a potential distribution may be obtained by connecting the plate 55 of photo-multiplier tube 50 to D.C. ground and connecting the photo-multiplier power supply 52 at its positive side to ground and at its negative side to the cathode 45 of photo-multiplier tube 50. Then by means of a resistance 56 connected across the photo-multiplier power supply 52 and by means of taps 57 on resistance 56, it is possible to apply to secondary electron emitters 51 different potentials, more specifically higher potentials, in the direction from cathode 45 to plate 55.

By way of example, it will be pointed out that the potential difference to be applied between plate 55 and cathode 45 may be of the order of 900 volts.

Plate 55 of photo-multiplier tube 50 is connected to ground through a filter 70 consisting of a capacitance 71 and an inductance 72 connected in parallel and on one side to plate 55 of photo-multiplier tube 50 and on the other to ground.

Filter 70 which is actually a tuned circuit will pass a band of frequencies including the carrier frequency of 48 kilocycles corresponding to the pulses produced by raster 12 and the side bands of 47.6 kilocycles and 48.4 kilocycles produced by the modulation by means of shutter 25 of the light pulses leaving raster 12. In other words, first photo-multiplier tube 50 transforms light pulses into electrical signals. Of these electrical signals, filter 70 selects those in the vicinity of its resonant frequency of 48 kilocycles for this embodiment, passing, therefore, also the side bands of 47.6 kilocycles and 48.4 kilocycles while attenuating the frequencies located below 47.6 kilocycles and above 48.4 kilocycles.

In other words, filter 70 will select the modulated wave and its first order side bands and introduce the modulated wave into the first high frequency amplifier 66 through a blocking capacitor 67 connected between plate 55 of photo-multiplier 50 and grid 68 of high frequency amplifier 66.

The function of capacitance 67 is to prevent any D.C. voltage applied to plate 55 of photo-multiplier 50 from reaching the grid 68 of tube 66. Cathode 69 of tube 66 is positively biased with respect to grid 68 of tube 66 by means of cathode resistor 96 by-passed to ground by capacitor 97. A resistance 73 is connected between grid 68 of tube 66 and through by-pass capacitor 75 to ground.

Plate 80 of high frequency amplifier 66 is connected to power supply 90 through a circuit consisting of a parallel tuned circuit 85 in series with the winding 95 of relay 98. Tuned circuit 85 consisting of capacitance 86 parallel with an inductance 87 is tuned to the same frequency of filter 70 so that only the desired frequency band appears across tuned circuit 85.

When the carrier of the modulated wave is smaller than a certain minimum value, a relatively large direct current will flow through tube 66 and inductance 87 which as is well-known presents a very small impedance to direct currents and through energizing coil 95 of relay 98. This current whenever the average amplitude of the modulated wave is smaller than a certain minimum value will be sufficient to maintain the armature 99 of relay 98 away from the stationary contacts 102 of relay 98 against the bias of a spring 103.

A by-passing capacitor 104 is connected between tuned circuit 85 and relay 98 on one side and to ground on its other side to shunt to ground any high frequency current to avoid any faulty operation of relay 98 caused by high frequency currents.

The amplified wave is coupled to a second high frequency amplifier tube 101 through a capacitance 105 connected between plate 80 of tube 66 and grid 100 of tube 101. A grid leak resistance 106 is provided at the interconnection between capacitance 105 and grid 100 of tube 101.

Tube 101 is self-biased by means of cathode resistance 115 by-passed to ground by capacitance 116. Plate 120 of tube 101 is connected to the same power supply 90 through coil 122. The inductance of coil 122 is in parallel with the capacitance 26 to form a tuned circuit in the plate circuit of tube 101 centered at the aforesaid system or carrier frequency. Inductance 122 is also the primary of transformer 130 having as its secondary winding coil 135.

One side 136 of secondary 135 of transformer 130 is connected to the plate 139 of detector diode 140, the cathode 141 of diode 140 being grounded. The other side 143 of secondary 135 of transformer 130 is connected to an R.C. filtering circuit consisting of a capacitance 145 connected between terminal 143 of winding 135 and ground and by resistance 146 connected on one side to terminal 143 of secondary 135 of transformer 130 and to the other to a grounded resistance 148. To the connection point 155 between resistance 146 and resistance 148 is connected another filtering capacitance 150.

Diode 140 will demodulate the amplified signal output from second high frequency amplifier tube 101 and may be considered to produce at its output two signals, namely, a D.C. voltage proportional to the average amplitude of the carrier wave and superimposed on the D.C. voltage the low frequency modulation voltage, in the present embodiment of 400 cycles per second signal.

The herein said 400 cycle audio signal, as hereinafter more fully described, is tapped off at point 155 of the output circuit of diode 140 and connected into the low frequency amplifier stages 165 indicated by the dotted-line rectangle in Figure 1. The D.C. component of the output signal of diode detector 140 is applied through resistance 170 connected between point 155 of the output circuit of diode detector 140 and grid leak resistance 106 of tube 101 to the grid 100 of tube 101 to control, therefore, the bias of the grid 100 with respect to cathode 121 of tube 101.

The use of a D.C. component of the output of detector 140 to bias previous amplifiers is well-known in the art under the name of automatic gain control, but in the present invention the above-mentioned D.C. component is applied to the grid 68 of the first high frequency amplifier tube 66 through a resistance 175 connected between point 155 of the output circuit of detector 140 and grid leak resistance 73 of tube 66 to perform two functions.

Resistor 175 is connected to ground at high frequencies by capacitance 75, while capacitance 110 connected on one side to resistance 106 and 170 and on the other to ground forms a similar grounding function in the biasing circuit of tube 101.

The application of a D.C. bias proportional to the average amplitude of the modulated envelope as previously mentioned will produce automatic gain control on tube 101 and also on tube 66, but in the present invention the change in D.C. plate current of the first high frequency amplifier tube 66 caused by the change in bias is also utilized to operate relay 98 so that whenever the D.C. component of the signal from diode detector 140 is above a certain value, tube 66 becomes so negatively biased that its plate current is brought below a certain preselected value at which it will be unable to maintain armature 99 of relay 98 away from stationary contact 102 against the bias of spring 103.

At this time, therefore, relay 98 will release its armature 99 which will then bridge the stationary contacts 102 to close an electrical circuit as hereinafter described.

In other words, the carrier wave produced by raster 12 is utilized in the present invention to operate relay 98 for closing or opening an electrical circuit and since the amplitude of the carrier wave produced by raster 12 by chopping the light beam 10 is proportional to the apparent brightness of the light source, it is now evident that spring 103 of relay 98 may be constructed so that its pulling force is slightly greater than the pulling force of energizing coil 95 of relay 98 when the amplitude or brightness of the star is at a certain minimum value.

By this means it is possible, therefore, to distinguish between stars having different brightnesses. For example, as previously mentioned, around Polaris which is a second magnitude star there is a cluster of fourth magnitude stars. While in previously known single star trackers it was impossible to distinguish between Polaris and the fourth magnitude stars surrounding it, with the present invention it is possible to adjust relay 98 so that it releases its armature 99 only when the brightness of a star is above a certain minimum value.

In other words, the novel star tracking device will be inoperative as long as an incorrect star is in the field of vision of the star tracking device and will become operative as soon as the preselected star enters the field of vision of the novel star tracker.

The low frequency component of the output of diode detector 140 as previously mentioned is introduced through a blocking capacitor 166 into the grid 251 of low frequency amplifier tube 252. Low frequency amplifier tube 252 is also self-biased by means of resistor 255 by-passed by capacitances 256 connected to cathode 257 of tube 252. Plate 260 is connected to the power supply 90 through load resistance 261 and its amplified signal is introduced through coupling capacitor 264 and grid leak resistance 267 into the grid 268 of power amplifier tube 266.

The power amplifier tube 266 is self-biased by means of resistance 270 by-passed by capacitances 271 connected to the cathode 275 of power amplifier 266. Power amplifier 266 in the present embodiment is a tetrode although any other suitable power amplifier tube may be used.

Screen grid 280 of tetrode 266 is connected to power supply 90 and plate 285 is also connected to power supply 90 through coil 289 of output transformer 290. The secondary 291 of output transformer 290 is connected to two field coils in parallel, 210 and 310, where coil 210 is the field winding of azimuth motor 220 while coil 310 is the field winding of elevation motor 215.

Elevation motor 215 is provided with a second winding 300 connected to an A.C. power source 195 through stationary contacts 102, while a similar winding 200 for azimuth motor 220 is connected to the same A.C. power supply 195 and to stationary contacts 102 through a capacitance 315.

The function of capacitance 315 is to produce a phase shift between the currents flowing in windings 200 and 300, or in other words, capacitance 315 serves to advance the current flowing through winding 200 of azimuth motor 220 by approximately 90° with respect to the current flowing through winding 300 of elevation motor 215.

It is, of course, now evident that current will flow in coils 200 and 300 of elevation and azimuth motors, respectively, only when stationary contacts 102 are bridged by the armature 99 of relay 98 or in other words only when the amplitude of the carrier wave, that is the brightness of the star being tracked, is greater than a certain minimum value.

It is seen, therefore, that our novel star tracker will not operate its tracking motors 215 and 220 to center the desired star in the star tracking device until the correct preselected star appears in the field of view of our novel star tracking device.

Figure 3B:
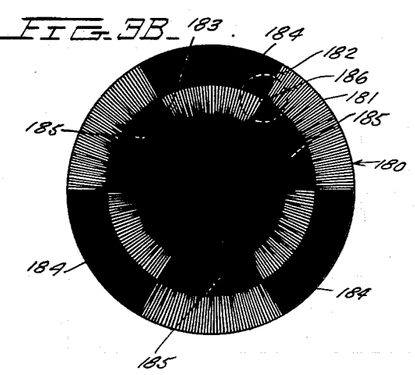
Figure 3B is a front view of a modified form of the shutter mechanism of our present invention having a single degree of freedom.

Referring now to Figure 3B showing a modified form of the shutter raster mechanism, it is there seen that by means of the shutter raster mechanism 180 the use of a raster 12 and separate shutter 25 is avoided for sensing radial displacements of the star image. In fact, when the raster shutter mechanism 180 is driven by its motor, it will operate in a manner similar to the combination of the raster 12 and shutter 25.

It is seen, in fact, from Figure 3B that raster shutter mechanism 180 is disc-shaped and provided with a number of spokes 181 lying on an outer ring 182 and an inner ring 183 and separated by opaque portions 184 on the outer ring and 185 on the inner ring.

In the present embodiment, three relatively opaque sections 185 and three sections 183 with spokes are provided in raster shutter mechanism 180, but this number is not critical and is a function of the number of poles of the motor used to drive mechanism 180, the speed of the motor and the desired light chopping frequency.

Figure 4A:
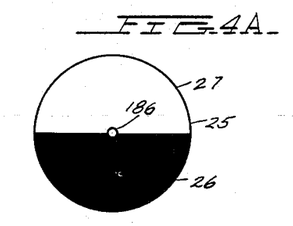
Figure 4A is a front view of the shutter of Figure 3A showing the star image at the center of the shutter.
Figure 4B:
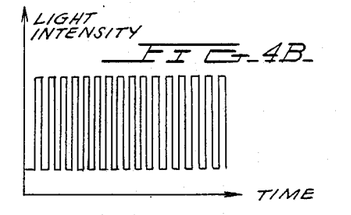
Figure 4B is a plot of the light pulses as they reach the cathode of the photo-multiplier tube for the condition of Figure 4A.
Figure 4C:
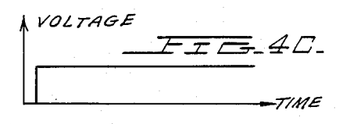
Figure 4C is the wave shape produced by detecting the pulses shown in Figure 4B.

Referring then to Figures 4A, 4B and 4C, it is there seen that when star 186 which is the preselected star is at the center of shutter 25, the light pulses reaching cathode 45 of photo-multiplier 50 will be as shown in Figure 4B. In other words, the light pulses reaching cathode 45 of photo-multiplier 50 will be only the result of the chopping action of raster 12 and will not be chopped by shutter 25 since at all times one-half of the image 186 of the preselected star will pass through shutter 25 as shown in Figure 4A.

This means also that the light pulses produced by raster 12 are not modulated at a low frequency by shutter 25 so that we may consider the light pulses shown in Figure 4B as an unmodulated carrier. When such an unmodulated carrier reaches the cathode 45 of photo-multiplier tube 50, it produces a similarly shaped electric wave which as previously described is amplified by high frequency amplifiers 66, 101 and detected by diode 140.

If the star is the preselected one, then assuming that the tracking device was held operative before, because the star is of the correct order the carrier shown in Figure 4B will be of enough amplitude to produce after passing through detector 140 a D.C. signal of sufficient amplitude to decrease the plate current of tube 66 to a value lower than the one necessary to keep relay 98 in its open position.

When, therefore, the carrier wave shown in Figure 4B is of amplitude greater than a certain minimum, the tracking device will be set ready to operate through relay 98, but if the star is in the position shown in Figure 4A, then only a carrier wave is produced at the photo-multiplier tube. The output from detector 140 will have, therefore, only a D.C. component as shown in Figure 4C which will serve to produce an A.G.C. signal in the high frequency amplifiers to increase or decrease the gain of these amplifiers depending on the magnitude of the incoming signal. At the same time, the output from detector 140 will serve to set the tracking motors 215 and 220 ready to operate as previously described.

Although motors 215 and 220 are now ready to operate, they will remain stationary because their field coils 310 and 210, respectively, are not energized due to the fact that no audio signal is produced by detector 140 so that low frequency amplifiers 252 and 266 remain inoperative.

Figure 5A:
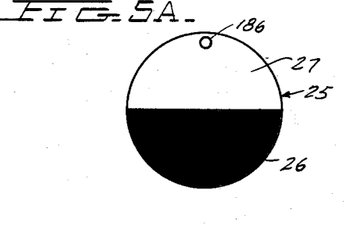
Figure 5A is a front view of the shutter of Figure 3A showing the star fully displaced in the vertical direction.
Figure 5B:
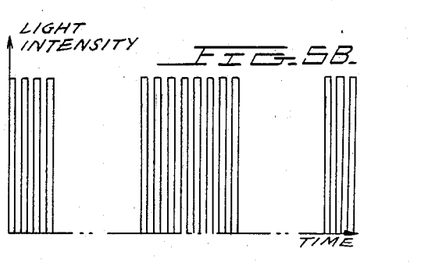
Figure 5B is a plot of the light pulses as they reach the cathode of the photo-multiplier tube for the condition shown in Figure 5A.
Figure 5C:
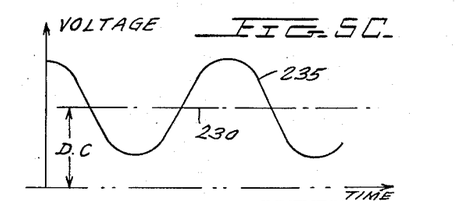
Figure 5C is a plot of the output of the detecting device of our novel star tracking device for the condition shown in Figure 5A.

Referring next to Figure 5A in which the star is shown completely displaced in the vertical direction, the modulated light wave reaching cathode 45 of photo-multiplier 50 will be as shown in Figure 5B. That is, now the light pulses produced by raster 12 are modulated at a low frequency by shutter 25 and since the star 186 is completely displaced into the field of view of the tracking device, modulation will be at a maximum as shown in Figure 5B. In other words, for half a cycle (see Figure 5B) the light pulses will be approximately twice as large as those shown in Figure 4B while at the other half cycle the light pulses will have zero amplitude.

Since shutter 25 chops a small image, it produces a square wave as can be seen in Figure 5B.

The pulses shown in Figure 5B are transformed into electrical pulses by photo-multiplier 50 and then amplified by the high frequency amplifiers 66 and 101 and detected by diode 140. The output from diode 140 shown in Figure 5C consists of a D.C. component 230 superimposed on which is an A.C. low frequency component 235. The D.C. component 230 is a measure of the illumination from the star while A.C. component 235 indicates the degree of modulation.

The D.C. component 230 has the same function as the D.C. component described in connection with Figure 4A, in other words, for A.G.C. and to operate relay 98, while the A.C. component 235 is applied to the audio frequency amplifiers 252 and 266 and applied by means of transformer 290 to the coils 210 and 310 of elevation and azimuth motors 220 and 215, respectively.

As previously mentioned, on the other hand, windings 200 and 300 of azimuth motor 220 and elevation motor 215 are 90° out of phase or, in other words, the current in winding 200 of azimuth motor 220 is 90° ahead of the current in winding 300 of elevation motor 215 due to the effect of capacitance 315. On the other hand, the current flowing in coils 210 and 310 of azimuth and elevation motors 220 and 215, respectively, because of the particular position of the star with respect to the shutter 25, will be in phase with current in winding 200 of azimuth motor 220 and 90° out of phase with respect to the current in winding 300 of elevation motor 215, thus causing elevation motor 215 to operate until the star is centered in shutter 25 as shown, for example, in application Serial No. 321,218, filed November 18, 1952.

Under these conditions, therefore, azimuth motor 220 will not operate since it has a zero quadrature of current, while elevation motor 215 will have maximum excitation since the currents in the two windings 300 and 310 are 90° out of phase. Elevation motor 215 is thus caused to rotate and bring the tracking device in such a position that the star 186 will be brought at the center of the field of view of the star tracking device in the position shown in Figure 4A.

Figure 6A:
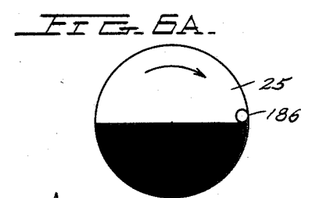
Figure 6A is a front view of the shutter of Figure 3A showing the star fully displaced in the horizontal direction.
Figure 6B:
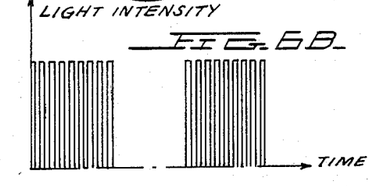
Figure 6B is a plot of the light pulses as they reach the cathode of the photo-multiplier for the condition shown in Figure 6A.

If on the other hand, the star should be completely off center in shutter 25 but in the horizontal direction as shown in Figure 6A, the modulated light wave will be as shown in Figure 6B, producing at the output of diode 140 a demodulated wave as shown in Figure 6C.

This demodulated wave will also have a D.C. component 236 and an A.C. component 237. Again while the D.C. component 236 is used for A.G.C. and for operating relay 98, the low frequency signal 237 is applied and amplified by low frequency amplifiers 252 and 266, energizing windings 210 and 310 of azimuth motor 220 and elevation motor 215.

Because of the position of star 186 in shutter 25, the currents flowing in windings 310 and 210 are now, respectively, in phase and 90° out of phase with respect to the currents flowing in windings 300 and 200 of elevation motor 215 and azimuth motor 220, respectively.

This causes elevation motor 215 to remain inoperative while azimuth motor 220 will now operate to bring star 186 from its displaced position to the position shown in Figure 4A.

It is evident, of course, that as soon as star 186 is brought back at the center of the shutter 25, the light wave will again be unmodulated or, in other words, will be of the shape shown in Figure 4B with the result that no current will flow in windings 210 and 310 of azimuth and elevation motors 220 and 215, respectively.

Figure 7A:
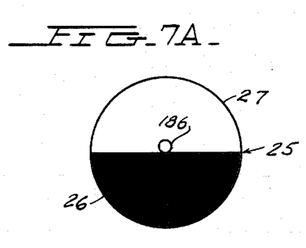
Figure 7A is a front view of the shutter of Figure 3A showing the star slightly off center.
Figure 7B:
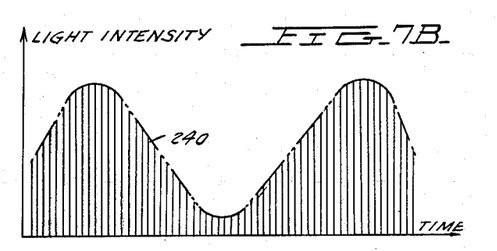
Figure 7B is a plot of the light pulses as they reach the cathode of the photo-multiplier tube for the condition shown in Figure 7A.
Figure 7C:
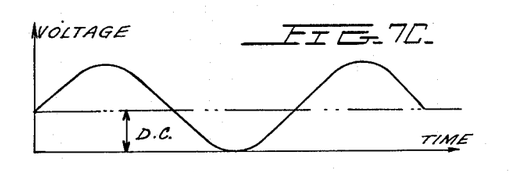
Figure 7C is a plot of the output of the detector of our novel star tracking device for the condition shown in Figure 7A.

If the star 186 is not completely displaced as in Figures 5A or 6A but is slightly off center as shown in Figure 7A, then the modulation will not be at a maximum and the modulated light wave shape will be as shown in Figure 7B and the detector output will be as shown in Figure 7C so that for the position of the star as shown in Figure 7A, only the elevation motor 215 will become operative to bring the star to the center of shutter 25. If the star is not located completely vertically or horizontally in shutter 25, then the low frequency current in windings 210 and 310 will be at such a phase angle that both azimuth motor 220 and elevation motor 215 will operate to bring the star 186 to the center of the shutter 25.

At this point again, no alternating current will flow through windings 210 and 310 and, therefore, the two tracking motors 220 and 215 will become inoperative. It is here necessary to point out that the drawings shown in Figures 4B, 5B, 6B, 7B and 4C, 5C, 6C and 7C are not in the same scale, light intensity scale and voltage scale, respectively.

Figure 11:
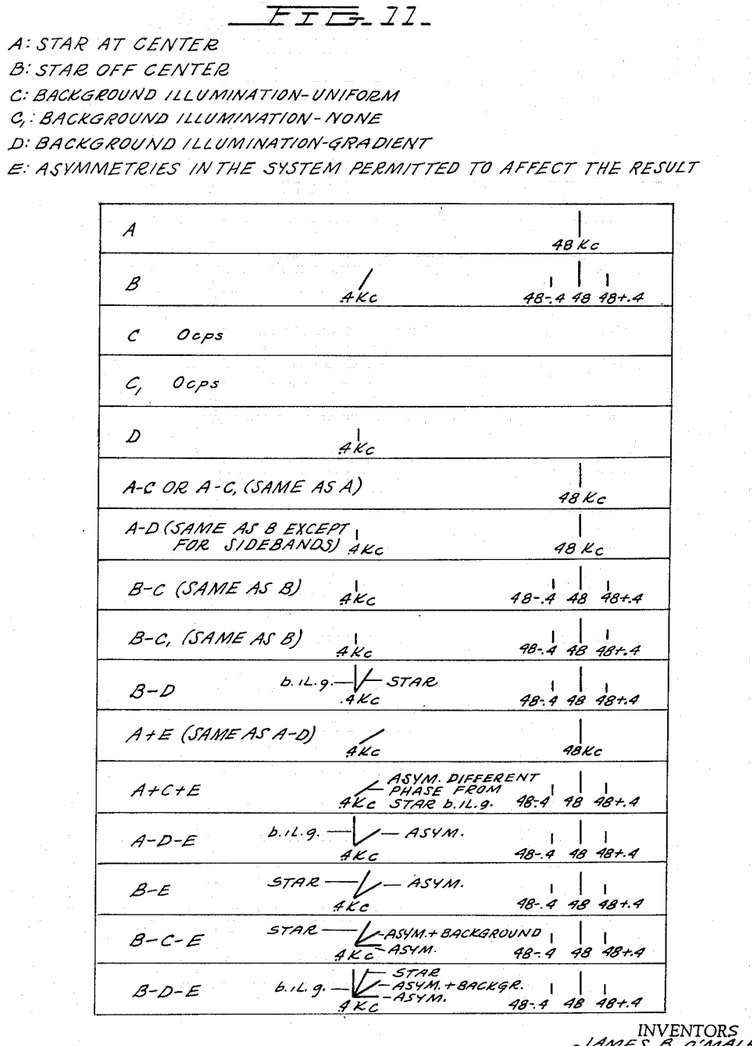
Figure 11 is a chart showing the signals produced by the star tracker for different positions of a star and different conditions of background illumination and asymmetries in the optical and photo-sensitive systems.

Referring now to Figure 11 which shows in chart form the signals produced by the present star tracker when provided with a raster 12 and a shutter 25 as above described, all the possible conditions are there shown such as the different positions of the star, the different background illuminations and asymmetries in the optical and photo-sensitive systems.

More specifically, on the chart of Figure 11, A corresponds to the condition in which the star is at center; B the star is off center; C uniform background illumination; $C_1$ no background illumination; D gradient of background illumination; E asymmetries in the optical and photo sensitive systems which can offset the results.

During condition A, start at center, the present star tracker will produce only a 48 kilocycle signal, namely only a high frequency unmodulated carrier. At condition B the star tracker will produce a low frequency signal of .4 kilocycle and high frequency signals of 48—.4 kilocycles, 48 kilocycles and 48+.4 kilocycles. At condition C the signal produced will be just a D.C. voltage; similarly for condition $C_1$. At D when a gradient of background illumination is present, a signal of .4 kilocycle is produced.

In addition, the chart of Figure 11 shows the signals produced by the novel star tracker when conditions A, B, C, $C_1$, D, E occur together in any possible combination. For example, for conditions B–D (star off center and gradient of background illumination present), there will be two signals having different amplitude and phase but the same frequency of .4 kilocycle and three high frequency signals of frequencies, respectively, 48—.4 kilocycles, 48 kilocycles and 48+.4 kilocycles.

Similarly, for more complex cases such as conditions B, D, E together, namely when the star is off center, a gradient of background illumination is present and there are asymmetries in the optical and photo-sensitive systems, there will be four signals of different amplitude and phase having a frequency of .4 kilocycle and in addition three high frequency signals having the above mentioned frequencies due to condition B and condition E.

This chart serves, therefore, the purpose of summarizing the above description on the operation of this novel star tracker.

Figure 10:
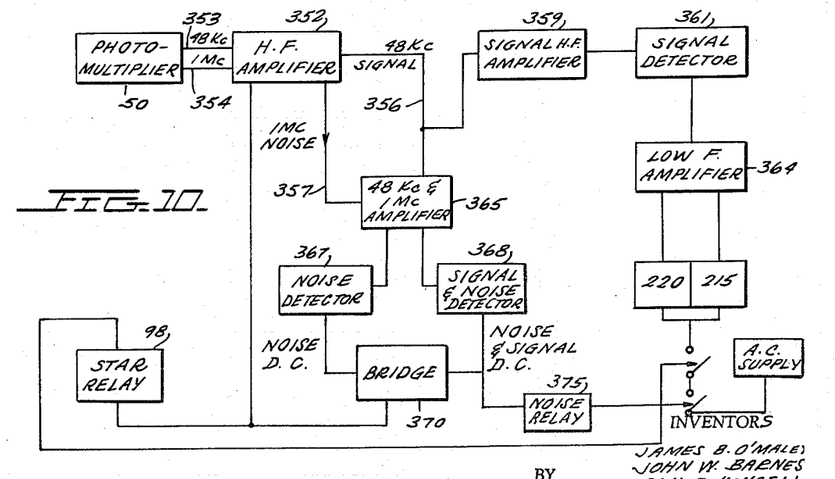
Figure 10 is a block diagram of the novel star tracking system of Figure 9.

Referring next to Figure 10 showing a block diagram of another embodiment of the present invention, the photo-multiplier tube 50 is connected to the high frequency amplifier 353 through two electrical circuits, one 353 passing only a band of frequencies around 48 kilocycles, the other 354 passing signals around one megacycle.

The function of circuit 353 is to pass at least the carrier and one side band of the modulated carrier produced at photo-multiplier 50. Circuit 353 will, therefore, be a tuned circuit tuned at the carrier frequency of the modulated wave, in this example 48 kilocycles. The modulated wave of 48 kilocycles will also have a certain amount of noise produced by background light in photo-multiplier 50 or, in other words, the signal reaching high frequency amplifier 352 through circuit 353 comprises a carrier of 48 kilocycles modulated by a low frequency signal, in this case 400 cycles per second, and background noise.

The second circuit 354 is tuned at a frequency much higher and remote than the frequency of the modulated wave. In this example, this frequency was selected to be one megacycle. Tuned circuit 354 is, therefore, tuned at one megacycle and will pass electrical signals having approximately that frequency.

The signals passing through circuit 354 consist essentially of noise, there being practically no side band of the 48 kilocycle wave at such a high frequency of one megacycle. In other words, circuit 354 serves to couple the noise ouput of photo-multiplier 50 into the high frequency amplifier 352. It is necessary to point out that the background noise produced at photo-multiplier 50 is quite uniformly distributed over the frequency spectrum. In other words, the amount of noise picked up at 48 kilocycles will be approximately equal to the noise picked up at one megacycle so that the high frequency amplifier 352 will amplify not only the desired signal but also the noise at a low frequency of 48 kilocycles and the equivalent noise at a higher frequency of one megacycle.

The output of high frequency amplifier 352 is provided with two tuned circuits, one the signal wave tuned circuit 356 tuned at 48 kilocycles, the other the noise wave tuned circuit 357 at one megacycle. Output tuned circuit 356 is connected to a signal amplifier 359 which in turn is connected to a signal detector 361 so that the demodulated low frequency signal is introduced into low frequency amplifier 364.

As previously shown, the low frequency amplifier 364 amplifies low frequency signals, in this case 400 cycle signals, thus supplying energizing current to the field windings 210 and 310 of the azimuth and elevation motors 220 and 215, respectively.

Signal output tuned circuit 356 and noise output tuned circuit 357 are both connected to an amplifier 365 whose output is connected to two detectors, a noise detector 367 and a signal detector 368. The two detectors 367, 368 demodulate both signal and noise waves, by passing to ground the resulting low frequency component and applying their corresponding D.C. components to a bridge circuit 370.

In other words, to opposite sides of bridge 370 two D.C. voltages are applied, one the D.C. voltage proportional to the noise amplitude, the other a D.C. voltage proportional to the average envelope produced by the combination of the modulated carrier and noise. Through the action of bridge 370 as hereinafter described at the output of bridge 370 there will only be the difference between the above mentioned D.C. voltages or in other words a D.C voltage which will be the difference of the noise plus signal D.C. and the noise D.C. voltage resulting, therefore, in a D.C. voltage approximately proportional only to the amplitude of the incoming carrier wave.

This carrier or signal D.C. voltage is then applied to the high frequency amplifier 352 to bias high frequency amplifier 352 in a well-known manner to obtain automatic gain control.

The D.C. voltage from bridge 370 is also used to operate the star relay 98 controlling the power circuit of azimuth and elevation motors 220 and 215, respectively.

Should the noise become of such amplitude as to make the operation of the novel star tracking device inaccurate, a D.C. signal from bridge 370 will operate a noise relay 375 to open the power circuit of azimuth and elevation motors 220 and 215 in a manner similar to the one described in connection with closing relay 98, thus making the novel star tracking device inoperative until the background light is reduced below a certain preselected value.

It will be evident from Figure 10 that the particular arrangement shown there is not the only one for obtaining the above-mentioned effects. For example, output tuned circuits 356 and 357 may be connected not to the output of high frequency amplifier 352 but to the output of the signal amplifier 359 and also noise relay 375 may be a common element with the star relay 98.

Figure 8:
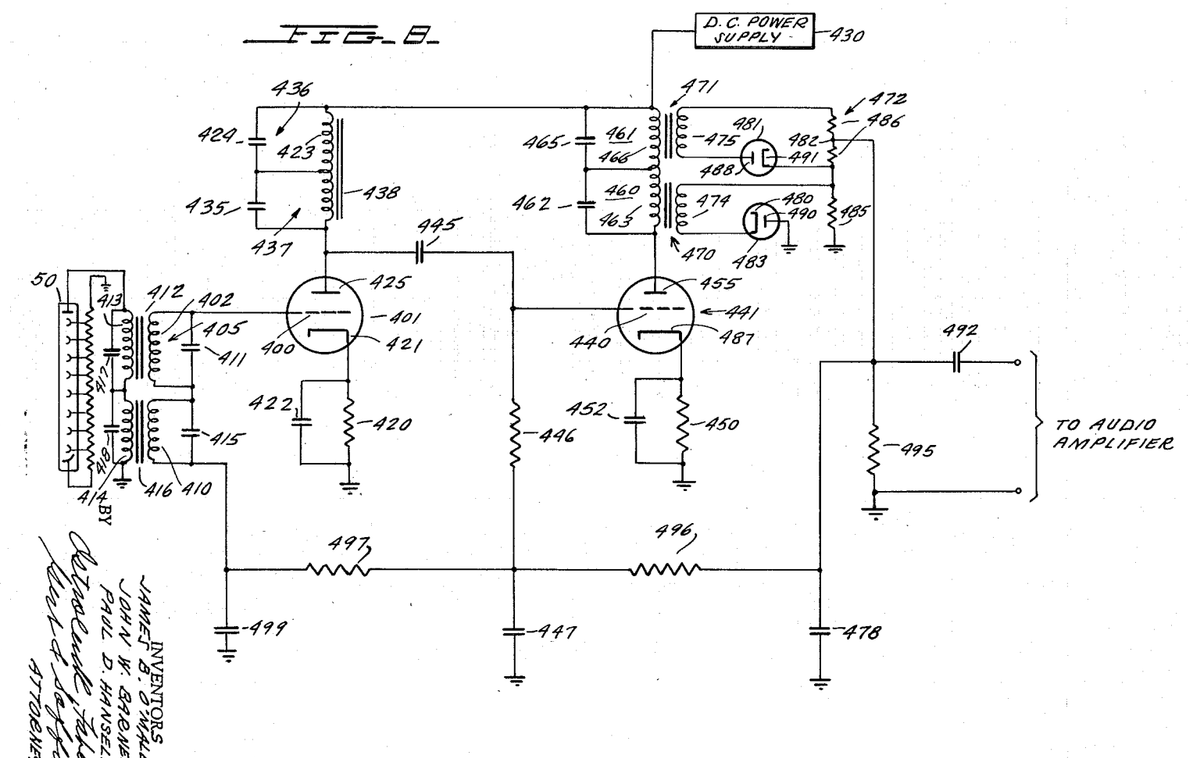
Figure 8 is a schematic diagram showing the principle used for balancing the effect of noise.
Figure 8C:
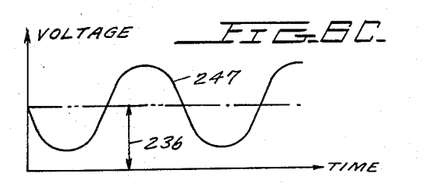

In order to see more clearly the exact function of the noise bucking circuit of the novel star tracking device, we will now refer to a schematic diagram of the simplified noise bucking circuit of the present invention shown in Figure 8.

The output from photo-multiplier tube 50 is coupled by means of transformers 412, 416 to high frequency amplifier tube 401. The primary windings 413 and 414 of transformers 412 and 416, respectively, are tuned by means of capacitances 417 and 418. The secondaries 405 and 410 of transformers 412 and 416 are tuned by means of capacitances 411 and 415 so that transformer 412 will constitute a tuned circuit tuned, for example, at a relatively high frequency of one megacycle, while transformer 416 will constitute a tuned circuit at about 48 kilocycles. Transformer 412 will, therefore, transmit to tube 401 a noise signal, while transformer 416 will transmit to tube 401 the modulated carrier.

One side 402 of secondary 405 of transformer 412 is connected to the grid 400 of tube 401. Tube 401 is self-biased through resistance 420 and capacitance 422 connected between ground and cathode 421 of tube 401. Plate 425 of tube 401 is connected to two tuned circuits in series, one tuned circuit 436 comprising an inductance 423 and a capacitance 424 tuned at the noise frequency of one megacycle, the other 437 comprising an inductance 438 and a capacitance 435 tuned at the carrier frequency of 48 kilocycles.

In other words, from the output of tube 401 by means of tuned circuits 436 and 437, it is possible to pick up a signal of approximately one megacycle and a signal of approximately 48 kilocycles. The two signals are introduced into a second high frequency amplifier 441 through an R.C. coupling circuit consisting of capacitance 445 and a resistance 446, or in other words, capacitance 445 and resistance 446 are connected to the grid 440 of tube 441. Tube 441 is also self-biased through a resistance 450 and capacitance 452 connected between the cathode 451 of tbue 441 and ground.

The one megacycle signal and the 48 kilocycle signal are further amplified by tube 441 and will appear across tuned circuits 460, 461 connected to the plate 455 of amplifier 441. Tuned circuit 460 consists of an inductance 463 and a capacitance 462 and is tuned to the relatively low carrier frequency of 48 kilocycles, while tuned circuit 461 consists of capacitance 465 and inductance 466 and is tuned to the one megacycle noise signal.

Inductances 463 and 466 also constitute the primaries of transformers 470, 471. The secondaries 474 and 475 of transformers 470 and 471, respectively, are connected to detector 472. In this particular example, detector 472 is shown as a double diode tube, but it is evident that two single diodes will be similarly capable of performing the functions hereinafter described.

In this simplified form of our novel noise eliminating circuit, winding 475 is connected on one side to the plate 488 of diode 481 of detector 472. The other side of secondary winding 475 is connected to a resistance 486. The other side of resistance 486 is connected to the cathode 491 of diode 481. Secondary winding 474 is conneced on one side to the cathode 480 of the second diode 483 of detector system 472, while its plate 490 is grounded. The other side of secondary winding 474 of transformer 470 is connected also to cathode 491 of diode 481 and to grounded resistance 485.

Resistance 486 is tapped at 482 so that the output from detector system 472 may be utilized for A.G.C. purposes and to operate the elevation and azimuth motors 215 and 220, respectively, as hereinafter described.

Since tuned circuit 460 was tuned at the carrier frequency of 48 kilocycles, transformer 470 will apply the modulated wave to detector 483 so that across resistance 485 there will appear a signal comprising a D.C. voltage and a low frequency voltage. The D.C. voltage will be proportional to the amplitude of the carrier plus the amplitude of the noises.

At the same time, tuned circuit 461 tuned at the noise frequency of one megacycle will apply to the secondary 475 of transformer 471 a signal consisting mostly of noise which will be detected by diode 481 so that on resistance 486 there will also appear a D.C. voltage proportional to the noises having a polarity opposite to the polarity of the previously mentioned D.C. voltage.

As a result of these opposite D.C. voltages, only the difference between the D.C. voltages and the low frequency signal will appear on resistance 486, the difference between the D.C. voltages being then a D.C. voltage proportional only to the carrier amplitude. The D.C. voltage now proportional to the carrier amplitude is tapped at 482 and applied by means of resistances 496 and 497 to the grid circuits of tubes 441 and 401, respectively; providing in other words an A.G.C. voltage to the grid circuits of the tubes 441 and 401 respectively. Resistances 496 and 497 are by-passed to ground by means of capacitances 447, 478 and 499.

At the same time, the low frequency signal will be applied to the audio amplifiers similar to the ones shown in Figure 1 through an R.C. circuit consisting of resistance 495 and a blocking capacitor 492. Tubes 401 and 441 are connected to a D.C. power supply shown schematically at 430.

Figure 9:
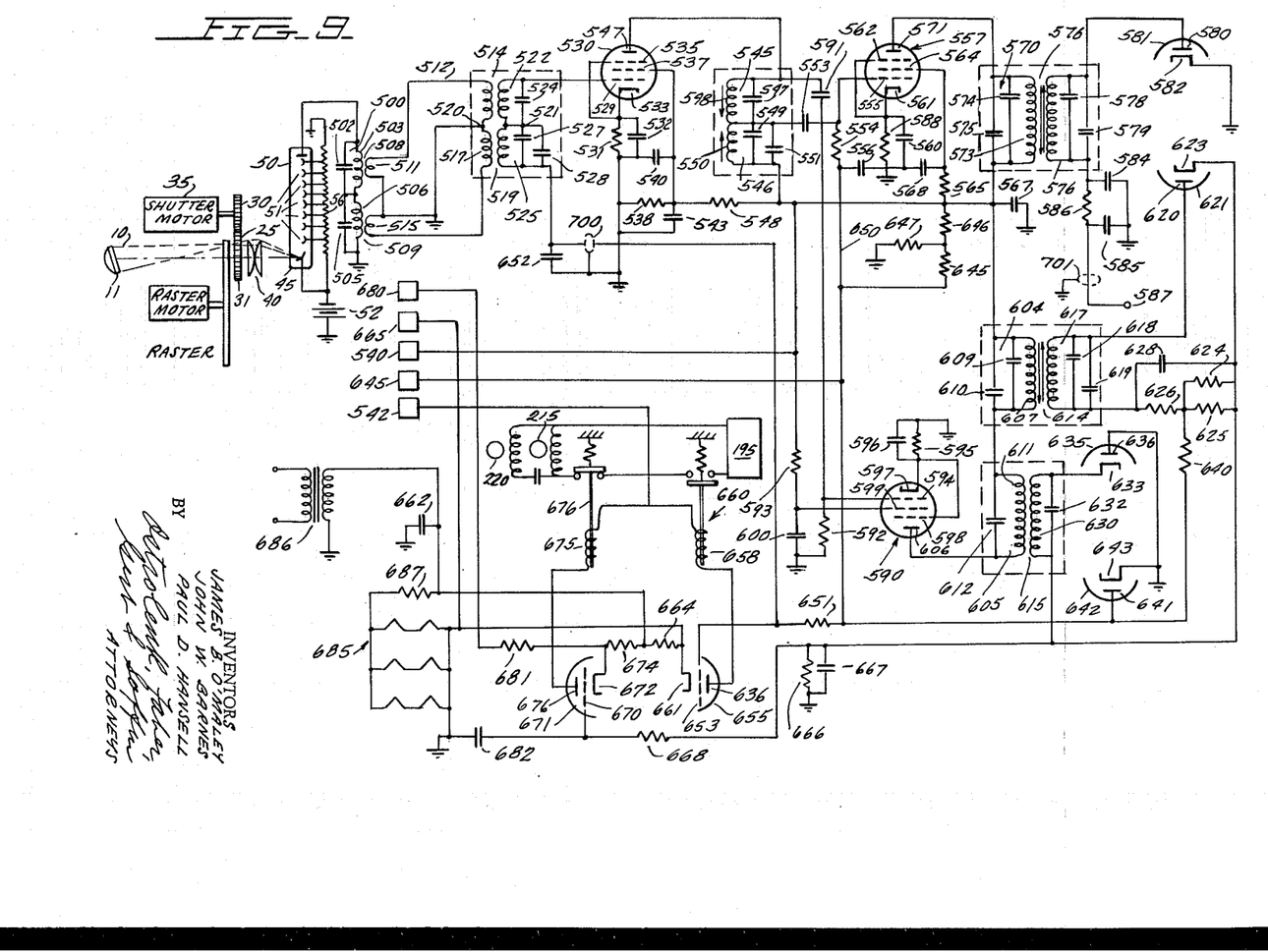
Figure 9 is a complete electric circuit diagram of a modified embodiment of the novel star tracking device.

Referring next to Figure 9 showing an actual embodiment of our novel star tracking device and noise eliminating circuit, the objective lens 11 focuses the light beam 10 coming from the preselected star in the plane of the raster 12 which as previously described is rotated by motor 20 through a shaft 21.

Following raster 12 is shutter 25 rotated through gear system 30, 31 by shutter motor 35. As previously shown in connection with Figure 3B, the shutter 25 and raster 12 may be united to form a shutter raster mechanism shown in Figure 3B. The position of the shutter 25 with respect to the focus of beam 10 determines the desired sensitivity of this after tracking device in that it will determine the amplitude of the image of the star being tracked. For example, when the shutter 25 is in the same plane of raster 12, that is in the focal plane of beam 10, the star image on shutter 25 will be a pin-point of very small cross-sectional dimensions. If shutter 25 is moved away from raster 12, the star image will become larger and larger so that the sensitivity of the device will decrease as shutter 25 is moved away from raster 12. The position of shutter 25 with respect to raster 12 or in other words with respect to the focal point of beam 10 will, therefore, be determined by the desired sensitivity.

Following shutter mechanism 25 is a lens system 40 for converging the beam 10 on the cathode 45 of photo-multiplier tube 50. Photo-multiplier tube 50 is provided with a number of secondary emitter plates 51 so that the electrical output of photo-mutiplier 50 will be of considerable amplitude with respect to the initial light beam intensity. The secondary emission plates 51 are provided with different potentials by means of resistance 56 connected on one side to a negative supply 52, for example 900 volts, and at the other end to ground.

The output from photo-multiplier tube 50 is applied to two tuned circuits 500 and 501. Tuned circuit 500 consists of a capacitance 502 in parallel with an inductance 503 and tuned to a preselected noise frequency, for example one megacycle. Tuned circuit 501 in series with tuned circuit 500 comprises a capacitance 505 and an inductance 506 in parallel and tuned to the carrier of the modulated signal, in this case 48 kilocycles.

Inductance 503 and 506 also constitute the primaries of input transformers 508 and 509, respectively. The secondary winding 511 of transformer 508 is connected to the primary 512 of a second transformer 514, while the secondary 515 of transformer 509 is connected to the primary 517 of another transformer 519. Actually, transformers 514 and 519 may just be one transformer with a center tap 520 in the primary and 521 in the secondary. Center tap 520 in the primary is grounded so that the common side of secondary windings 511 and 515 of transformers 503 and 506 is also grounded.

The secondary winding 522 of transformer 514 is tuned by capacitance 524 at the noise frequency of one megacycle, while the secondary winding 525 is tuned by capacitances 527 and 528 in parallel to the carrier frequency of the modulated wave, 48 kilocycles.

One side of winding 522 is connected to the control grid 529 of high frequency amplifier 530. Tube 530 is self-biased through resistance 531 and capacitance 532 connected on one side to cathode 533 and on the other to ground. In this particular example tube 530 is a pentode although any other amplifier tube capable of operating at approximately one megacycle would meet the requirements.

Suppressor grid 535 of tube 530 is connected to cathode 533 while screen grid 537 is connected to ground through a resistance 538 by-passed by capacitance 540 and is connected to the D.C. power supply 540 through resistance 548.

To provide further by-passing of the screen grid resistance 538, another by-pass capacitance 543 is connected between screen grid 547 and ground. Two tuned circuits in series, 545 and 546, are connected to the plate 547 of amplifier 530. Tuned circuit 545 is tuned to the noise frequency of one megacycle by means of capacitance 547 and inductance 548, while tuned circuit 546 is tuned to the carrier frequency of 48 kilocycles through capacitances 549 and 551 and inductance 550.

Signals around the 48 kilocycles are then applied through coupling capacitor 553 and resistance 554 to the grid 555 of another high frequency amplifier 557. Tube 557, also a pentode in this example, is self-biased by means of resistance 558 and capacitance 560 connected between the cathode 561 of tube 557 and ground. Its suppressor grid 562 is connected to cathode 561, while its screen grid 564 is connected to power supply 540 through a dropping resistance 565 connected to ground by capacitance 567 and by-passed by capacitance 568. Grid leak resistance 554 is grounded through capacitance 556.

The output from tube 557 will consist essentially of frequencies around the carrier, 48 kilocycles. These frequencies will appear in the tuned circuit 570 connected a plate 571 of amplifier 557. Tuned circuit 570 consists of an inductance 573 in parallel with capacitances 574 and 575. Inductance 573 is a primary winding of the transformer 576. The secondary 577 of transformer 576 is also tuned to capacitances 578 and 579. Secondary winding 577 of transformer 576 is connected to the plate 580 of diode detector 581 whose cathode 582 is grounded.

Diode 581 will demodulate the modulated carrier and while the high frequency components will be by-passed to ground by filter capacitances 584 and 585, the low frequency signal will appear across resistance 586 and will be applied through terminal 587 to low frequency signal amplifiers as the audio amplifiers 252 and 266 as described in connection with Figure 1, terminal 587 being comparable to point 155 in the Figure 1 circuit.

At the same time, the one megacycle signal and the 48 kilocycle signal are also applied to another high frequency amplifier 590 through coupling capacitor 591 and resistance 592. More particularly, capacitance 591 and resistance 592 are connected to the grid 594 of amplifier 590. Amplifier 590 is self-biased by resistance 595 and capacitance 596 connected between cathode 597 and ground.

Again here in this particular embodiment, high frequency amplifier tube 590 was chosen to be a pentode and, therefore, its suppressor grid 598 is shown connected to the cathode 597 while its screen grid 599 is connected to the power supply 540 through resistance 593 and by-passed to ground through a capacitance 600.

The output circuit of tube 590 comprises two tuned circuits 604 and 605 connected to the plate 606 of tube 590. Tuned circuit 604 comprises an inductance 607 in parallel with capacitances 609 and 610 and is tuned to the carrier frequency of 48 kilocycles, while tuned circuit 605 having an inductance 611 and capacitance 612 is tuned to the noise frequency of one megacycle. Inductances 607 and 611 are also the primaries of transformers 614 and 615 respectively.

The secondary winding 617 of transformer 614 is tuned by the parallel combination of capacitances 618 and 619 and connected to the plate 620 of diode 621. Cathode 623 of diode 621 is connected to parallel resistances 624 and 625, to a series resistor 626 and then to the other side of winding 617. A capacitance 628 by-passes high frequency signals appearing at the output of diode 621 so that across the resistance combination 624, 625 and 626 there will be only the D.C. voltage.

Diode detector 621 serves to demodulate the modulated wave of approximately 48 kilocycles so that in this output circuit there will only be a D.C. voltage proportional to the carrier and noise amplitude and a low frequency A.C. voltage representing the original low frequency signal. This low frequency signal is shorted through capacitance 628 so that only the D.C. voltage proportional to the carrier and noise amplitude will appear across the resistance combination 624, 625 and 626.

Consequently, winding 630 of noise transformer 615 is tuned to one megacycle by capacitance 632 and is connected on one side to the cathode 633 of detector 635, the plate 636 of detector 635 being connected to ground.

The other side of winding 630 is connected to the parallel combination of resistances 624 and 625. Diode 635 will rectify the one megacycle noise signal and will produce, therefore, across the resistance combination 624 and 625 a D.C. voltage proportional to the noise amplitude.

It was mentioned previously that diode 621 applied across resistances 624, 625 and 626 a D.C. voltage proportional to the carrier amplitude plus noise. Since the D.C. voltage produced by diode 635 is 180° out of phase with respect to the D.C. voltage produced by diode 621, the noise component of these D.C. voltages will cancel each other leaving a D.C. voltage proportional only to the amplitude of the carrier wave. This D.C. voltage is used in a delay A.G.C. circuit.

More specifically, the above-mentioned D.C. voltage is supplied through a resistance 640 to the plate 641 of a delay diode 642, the cathode 643 of the delay diode being grounded. Plate 641 of the delay diode is at a certain preselected voltage, being connected to a D.C. supply 645 so that diode 642 will be conducting until the D.C. voltage from resistance combination 624 and 625 is of such magnitude as to cut off diode 642.

When this occurs, the D.C. voltage applied from resistances 624 and 625 will be applied to the grids 529 and 555 of tubes 530 and 557, respectively, through series resistances 645 and 646 where resistance 646 and resistance 647 grounded on one side constitute a potential divider.

Resistance 646 is connected on the other side to resistance 565 and by-passed to ground by capacitance 567. The A.G.C. voltage is applied to the grid 555 of tube 557 through conductor 650 and applied to the grid 529 of tube 530 through resistance 651 by-passed to ground by capacitance 652.

Furthermore, the D.C. voltage from diode 642 is applied through resistance 651 to the grid 653 of triode 655. The plate 656 of triode 655 is connected to the energizing coil 658 of relay 660 similar to relay 98 of Figure 1. Relay 660, also called the star relay, serves to close the power circuit of azimuth and elevation motors 220 and 215 when the carrier amplitude or, in other words, the D.C. voltage reaching grid 653 reaches a certain predetermined minimum which is selected with the knowledge of the brightness of the desired star.

The cathode 661 of triode 655 is connected to ground through a by-pass capacitance 662 and a biasing resistance 664 and may be biased by means of D.C. supply 665. The noise D.C. voltage from diode 635 is applied through resistance 666 shunted by capacitance 667 and through series resistance 668 to the grid 670 of triode 671. The cathode 672 of triode 671 is biased by resistance 674 and by-passed to ground through a capacitance 662.

The plate 676 of triode 671 is connected to the energizing coil 675 of noise relay 676 which also is similar to relay 98 shown in Figure 1. Cathode 672 of triode 671 is further biased by a D.C. potential from D.C. supply 680 applied to cathode 672 through a resistance 681, while grid 670 is by-passed to ground by capacitance 682. Triodes 655 and 671 may actually constitute the two sections of a double triode tube as shown in Figure 9 or they may be separate triodes if desired.

When the D.C. voltage from resistances 624 and 625 proportional to the average carrier amplitude is greater than a certain preselected minimum value, relay 660 will close the contacts 102, 102 of the power circuit 195 for azimuth and elevation motors 220 and 215 in a manner similar to the one described in connection with Figure 1.

When, on the other hand, the background noise produced by other light sources in the proximity of the preselected star reaches a certain maximum value, a noise voltage will be applied to the grid 670 of triode 671 from a diode 635, thus changing the current flowing in the plate circuit of tube 671 and more specifically the current flowing in energizing coil 675 of relay 676, thus causing the relay 676 to open the power circuit of azimuth and elevation motors 220 and 215, respectively.

It is thus seen that our novel star tracking device will automatically start operating as soon as the star of the correct brightness appears in the field of view of our star tracking device. It will then move until the star is located at the center of its optical system. It will stop operating whenever the noise or background light reaches a certain preselected value and will return in operation as soon as the background light or noise goes below the previously mentioned preselected level.

The plates 547, 571, 606, 636, and 676 of tubes 530, 557, 590, 655 and 671 are all connected through various circuits as clearly shown in Figure 9 to power supplies 540 and 542.

The above-mentioned tubes plus the diodes 581, 621 which may actually be a double diode tube and diodes 635 and 642 which may also be a double diode tube have their filaments shown generally at circuit 685 heated through a filament transformer 686, the secondary winding having one side of which is connected to filament circuit 685 through a resistance 687 and the other side of which is connected to ground, the other side of the filament circuit 685 being also connected to ground.

Typical values and designations for the circuit elements of Figure 9 are as follows:

Capacitances:

| | | |
|---|---|---:|
| 524 | micromicrofarads | 47 |
| 527 | do | 30 |
| 528 | do | 250 |
| 532 | microfarads | 0.33 |
| 540 | do | 0.02 |
| 543 | do | 10.0 |
| 547 | micromicrofarads | 47 |
| 549 | do | 30 |
| 551 | do | 250 |
| 553 | do | 47 |
| 556 | microfarads | 0.008 |
| 560 | do | 0.22 |
| 567 | do | 0.1 |
| 568 | do | 0.02 |
| 574 | micromicrofarads | 30 |
| 575 | do | 250 |
| 578 | do | 30 |
| 579 | do | 250 |
| 584 | do | 100 |
| 585 | microfarads | 0.0018 |
| 591 | micromicrofarads | 30 |
| 596 | microfarads | 0.22 |
| 600 | do | 0.02 |
| 609 | micromicrofarads | 250 |
| 610 | do | 30 |
| 612 | do | 47 |
| 618 | do | 250 |
| 619 | do | 30 |
| 628 | do | 100 |
| 632 | do | 47 |
| 652 | microfarads | 0.02 |
| 662 | do | 0.05 |
| 667 | micromicrofarads | 100 |
| 682 | microfarads | 0.05 |

Resistances:

| | |
|---|---|
| 531 | 68 ohms |
| 538 | 27 kilo-ohms |
| 548 | 39 kilo-ohms |
| 554 | 1 mega-ohms |
| 558 | 390 ohms |
| 565 | 100 kilo-ohms |
| 586 | 1 mega-ohms |
| 592 | 2 mega-ohms |
| 593 | 100 kilo-ohms |
| 595 | 150 ohms |
| 625 | 510 kilo-ohms |
| 626 | 680 kilo-ohms |
| 640 | 3 mega-ohms |
| 645 | 20 mega-ohms |
| 646 | 510 kilo-ohms |
| 647 | 100 kilo-ohms |
| 651 | 2 mega-ohms |
| 664 | 1.2 kilo-ohms |
| 666 | 1 mega-ohms |
| 668 | 1 mega-ohms |
| 674 | 1.2 kilo-ohms |
| 681 | 160 ohms |
| 687 | 7.5 ohms |

Tubes:

| | |
|---|---|
| 530 | 12AU6 |
| 557 | 12BA6 |
| 581—621 | 12AL5 |
| 590 | 12BA6 |
| 635—642 | 12AL5 |
| 655—671 | 12AT7 |

Some leads are shielded and the shields grounded as shown, for example, at 700, 701, etc.

In the foregoing we have described the invention solely in connection with specific illustrative embodiments thereof. Since many variations and modifications of the invention will now be obvious to those skilled in the art, we prefer to be bound not by the specific disclosures herein contained but only by the appended claims.

We claim:

1. A star tracker comprising an optical system, means positioned around the focal point of said optical system for double modulating the light beam from a preselected star, transducer means transforming said double modulated light beam into a modulated electric wave, a first electric circuit tuned to the carrier frequency of said electric wave, a second electric circuit tuned to a frequency remote from said carrier frequency, the said two electrical circuits being connected to the output of said transducer means for extracting from said transducer means information plus noise and noise alone, respectively, an amplifier, said tuned circuits being connected to the input of said amplifier, output circuits tuned to the said frequencies connected to the output of said amplifier, means for individually detecting the said information plus noise signal and the noise signal, the D.C. components of the output of said detectors being a function of the average amplitude of said information plus noise wave and of said noise wave alone, respectively, a resistive bridge connected to the output of said detectors for comparing the said two D.C. components, an automatic gain control circuit connected to the output of said bridge for controlling the bias voltage of said amplifier, a utilization circuit for said star tracker also connected to the output of the said information plus noise detector to utilize the alternating component of the output from said detector.

2. A star tracker comprising an optical system, means at the output of said optical system for discriminating between a predetermined star and other stars and background illumination, said means comprising a rotating shutter and a raster for double modulating the beam from said star and for providing information on the position of said star in said optical system, transducer means in the path of said light beam for transforming said double modulated beam into a modulated electrical wave, an electrical circuit tuned to the frequency of the carrier of said modulated wave at the output of said transducer means, a second circuit tuned at a frequency remote from the frequency of said carrier connected to the output of said transducer for extracting from said transducer noise voltage, a high frequency amplifier connected to said tuned circuits for simultaneously amplifying said signal voltage and said noise voltage, individual amplifying and detecting means for amplifying and detecting the said signal and noise voltages, means at the output of said detecting means for comparing the D.C. components from said detecting means, function of the signal plus noise level and the noise level, respectively, an automatic gain control circuit connected between the output of said last means and the input of said high frequency amplifier, said automatic gain control circuit applying to said high frequency amplifier a bias voltage, direct function only of the average amplitude of said signal wave, thus compensating for the effects of noise on the said star tracker.

3. A star tracker comprising an optical system, means at the output of said optical system for selecting a predetermined star from other stars and from background illumination, said means comprising a rotating shutter and raster for double modulating the beam from said star and for providing information on the position of said star in said optical system, transducer means for transforming said double modulated beam into electrical signals, a first tuned electrical circuit tuned to the carrier frequency of said electrical signals, a second electrical circuit tuned to a frequency remote from said carrier frequency, said electrical circuits being connected to the output of said transducer, an amplifier connected to the output of said electrical circuits and amplifying the signals derived from the said two tuned circuits, means at the output of said amplifier for individually selecting and amplifying the signals from said amplifier, detectors connected to the output of said means, a bridge circuit at the output of said detectors for comparing the D.C. components at the output of said detectors derived from the said two signals, an automatic gain control circuit connected to the output of said bridge circuit and to the input of said first amplifier for providing an automatic gain control voltage on said amplifier, function only of the average envelope amplitude of the first of said signals, positioning motors controlled by said amplifying and detecting means for moving said star tracker until said star is centered in said system in response to the position information.

4. In an electrical circuit for amplifying and detecting intelligence of modulated carrier waves, a photomultiplier tube, an amplifier connected to the output of said photo-multiplier tube, an output circuit connected to said amplifier, said output circuit comprising two tuned circuits, the first of said circuits being tuned to the carrier frequency of the modulated wave and the second of said circuits being tuned to a frequency remote from said carrier for extracting from said amplifier a sample of the noise voltage, due to said photo-multiplier tube a first detector connected to said first tuned circuit for extracting from said modulated wave, respectively, information and a D.C. component which is a function of the average amplitude of the modulated wave plus noise, a second detector connected to the second of said tuned circuits for obtaining a D.C. voltage which is a function of the average amplitude of the noise voltage bridge circuit means having its input terminals connected to the output of said detectors; and an automatic gain control circuit connected between the output terminals of said bridge means and said amplifier for applying to the input of said amplifier a biasing voltage which is a function only of the average amplitude of the intelligence of the modulated wave without noise.

5. In an electrical circuit for amplifying and detecting intelligence of modulated carrier waves, a photo-multiplier tube, an amplifier connected to the output of said photo-multiplier tube, an output circuit connected to said amplifier, said output circuit comprising two tuned circuits, the first of said circuits being tuned to the carrier frequency of the modulated wave and the second of said circuits being tuned to a frequency remote from said carrier for extracting from said amplifier a sample of the noise voltage, due to said photo-multiplier tube a first detector connected to said first tuned circuit for extracting from said modulated wave, respectively, information and a D.C. component which is a function of the average amplitude of the modulated wave plus noise, a second detector connected to the second of said tuned circuits for obtaining a D.C. voltage which is a function of the average amplitude of the noise voltage bridge circuit means having its input terminals connected to the output of said detectors; and an automatic gain control circuit connected between the output terminals of said bridge means and said amplifier for applying to the input of said amplifier a biasing voltage which is a function only of the average amplitude of the intelligence of the modulated wave without noise, and a circuit connected to the output of said first detector for utilizing the said information carried by said modulated wave.

6. In an electrical circuit for amplifying and detecting intelligence of modulated carrier waves, a photo-multiplier tube, an amplifier connected to the output of said photo-multiplier tube, an output circuit connected to said amplifier, said output circuit comprising two tuned circuits, the first of said circuits being tuned to the carrier frequency of the modulated wave and the second of said circuits being tuned to a frequency remote from said carrier for extracting from said amplifier a sample of the noise voltage, due to said photo-multiplier tube a first detector connected to said first tuned circuit for extracting from said modulated wave, respectively, information and a D.C. component which is a function of the average amplitude of the modulated wave plus noise, a second detector connected to the second of said tuned circuits for obtaining a D.C. voltage which is a function of the average amplitude of the noise voltage, bridge circuit means comprising resistive elements, the input terminals of said bridge connected to the output of said detectors; and an automatic gain control circuit connected between the output terminals of said bridge means and said amplifier for applying to the input of said amplifier a biasing voltage which is a function only of the average amplitude of the intelligence of the modulated wave without noise, and control means in circuit with said amplifier and responsive to the applied automatic gain control biasing voltage for establishing a control action dependent upon a predetermined amplitude of the modulated wave.

7. In an electrical circuit for amplifying and detecting intelligence of modulated carrier waves, a photo-multiplier tube, an amplifier connected to the output of said photo-multiplier tube, an output circuit connected to said amplifier, said output circuit comprising two tuned circuits, the first of said circuits being tuned to the carrier frequency of the modulated wave and the second of said circuits being tuned to a frequency remote from said carrier for extracting from said amplifier a sample of the noise voltage, due to said photo-multiplier tube a first detector connected to said first tuned circuit for extracting from said modulated wave, respectively, information and a D.C. component which is a function of the average amplitude of the modulated wave plus noise, a second detector connected to the second of said tuned circuits for obtaining a D.C. voltage which is a function of the average amplitude of the noise voltage, bridge circuit means comprising resistive elements, the input terminals of said bridge connected to the output of said detectors; and an automatic gain control circuit connected between the output terminals of said bridge means and said amplifier for applying to the input of said amplifier a biasing voltage, function only of the average amplitude of the modulated wave without noise, control means in circuit with said amplifier and responsive to the applied automatic gain control biasing voltage for establishing a control action dependent upon a predetermined amplitude of the modulated wave and, a circuit connected to the intelligence of the output of the said first detector for utilizing the said information carried by said modulated wave the said utilization circuit being interconnected with said control means for corresponding predetermined operation thereof.

8. In an electrical circuit for amplifying and detecting intelligence of modulated carrier waves, a photo-multiplier, tube, an amplifier connected to the output of said photo-multiplier tube having across its input terminals a plurality of tuned circuits, one of said circuits being tuned to the carrier frequency of a modulated wave, the second of said tuned circuits being tuned to a frequency remote from said carrier frequency for receiving noise voltage, due to said photo-multiplier tube tuned circuits at the output of said amplifier being also tuned to the said frequencies, individual detecting means being connected to said tuned circuits for, respectively, obtaining noise voltage and a D.C. component, which is a function of the average amplitude of the modulated wave plus noise and a D.C. component which is a function of the average amplitude of the noise voltage, bridge circuit means comprising a plurality of impedances, said bridge circuit means having its input terminals connected to said detectors, an automatic gain control circuit connected between the output terminals of said bridge means and said amplifier for applying to the input of said amplifier a D.C. biasing voltage which is a function only of the average amplitude of the intelligence of the modulated wave without noise, control means in circuit with said amplifier and responsive to the applied automatic gain control biasing voltage for establishing a control action dependent upon a predetermined amplitude of the modulated wave, and control means in circuit with said detecting means that obtains the D.C. component therefrom which is a function of the average amplitude of the noise signal for establishing a control action dependent upon a predetermined amplitude of the noise signal.

9. In an electrical circuit for amplifying and detecting intelligence of modulated carrier valves, a photo-multiplier tube, an amplifier connected to the output of said photo-multiplier tube having across its input terminals a plurality of tuned circuits, one of said circuits being tuned to the carrier frequency of the modulated wave, a second of said tuned circuits being tuned to a frequency remote from said carrier frequency for receiving noise voltage, due to said photo-multiplier tube tuned circuits at the output of said amplifier being also tuned to the said frequencies, individual detecting means being connected to said tuned circuits for, respectively, obtaining noise voltage and a D.C. component, which is a function of the average amplitude of the modulated wave plus noise and a D.C. component which is a function of the average amplitude of the noise voltage, a bridge circuit means comprising a plurality of impedances, said bridge circuit means having its input terminals connected to said detectors, an automatic gain control circuit connected between the output terminals of said bridge means and said amplifier for applying to the input of said amplifier a D.C. biasing voltage which is a function only of the average amplitude of the intelligence of the modulated wave, a circuit connected to the output of the said first detector for utilizing the said information carried by said modulated wave without noise, control means in circuit with said amplifier and responsive to the applied automatic gain control biasing voltage for establishing a control action dependent upon a predetermined amplitude of the modulated wave, and control means in circuit with said detecting means that obtains the D.C. component therefrom which is a function of the average amplitude of the noise signal for establishing a control action dependent upon a predetermined amplitude of the noise signal, the said utilization circuit being interconnected with said control means for corresponding predetermined operation thereof.

10. In a device for tracking a light, transducer means including a photo-multiplier tube for transforming a modulated light beam into a modulated electrical carrier wave, noise voltage being produced at said transducer means with a substantially uniformly distributed wide frequency spectrum, a double tuned amplifier connected to the output of said transducer, said amplifier having two tuned circuits at its input and two tuned circuits at its output, the first of the said input tuned circuits being tuned to the carrier frequency of the modulated wave, the second of said input tuned circuits being tuned to a frequency remote from said carrier frequency for extracting from said transducer means a sample of the noise voltage, the said output tuned circuits being also tuned to the same respective frequencies, a first detector connected to the output tuned circuit tuned to the said carrier frequency for obtaining an information voltage and a D.C. component which is a function of the average amplitude of the modulated wave plus noise, a second detector connected to the output noise tuned circuit for obtaining a D.C. component which is a function of the average amplitude of the noise voltage, a bridge circuit connected to said detectors, an automatic gain control circuit means having its input terminals connected between the output terminals of the bridge circuit means and said amplifier for applying to the input of said amplifier a D.C. bias voltage which is a function only of the average amplitude of the intelligence of the modulated wave without noise.

11. In a device for tracking a light, transducer means including a photo-multiplier tube for transforming a modulated light beam into a modulated electrical carrier wave, noise voltage being produced at said transducer means with a substantially uniformly distributed wide frequency spectrum, a double tuned amplifier connected to the output of said transducer, said amplifier having two tuned circuits at its input and two tuned circuits at its output, the first of the said input tuned circuits being tuned to the carrier frequency of the modulated wave, the second of said input tuned circuits being tuned to a frequency remote from said carrier frequency for extracting from said transducer means a sample of the noise voltage, the said output tuned circuits being also tuned to the same respective frequencies, a first detector connected to the output tuned circuit tuned to the said carrier frequency for obtaining an information voltage and a D.C. component which is a function of the average amplitude of the modulated wave plus noise, a second detector connected to the output noise tuned circuit for obtaining a D.C. component which is a function of the average amplitude of the noise voltage, a bridge circuit means having its input terminals connected to said detectors, an automatic gain control circuit connected between the output terminals of the bridge circuit means and said amplifier for applying to the input of said amplifier a D.C. bias voltage which is a function only of the average amplitude of the intelligence of the modulated wave, a circuit connected to the output of the said first detector for utilizing the said information carried by said modulated wave without noise, and control means in circuit with said second detector output for establishing a control action on said utilization circuit in accordance with a predetermined amplitude of said second detector output.

References Cited in the file of this patent
UNITED STATES PATENTS

| | | |
|---|---|---|
| 2,246,771 | Zuccarello | June 24, 1941 |
| 2,354,508 | Dome | July 25, 1944 |
| 2,424,193 | Rost et al. | July 15, 1947 |
| 2,484,914 | Spielman | Oct. 18, 1948 |
| 2,513,367 | Scott | July 4, 1950 |
| 2,516,356 | Tull | July 25, 1950 |
| 2,604,528 | Obermaier | July 22, 1952 |
| 2,638,811 | Williams | May 19, 1953 |
| 2,647,436 | Shapiro | Aug. 4, 1953 |
| 2,678,581 | Reisner | May 18, 1954 |

FOREIGN PATENTS

| | | |
|---|---|---|
| 540,233 | Great Britain | Oct. 9, 1941 |